United States Patent
Wall

(10) Patent No.: US 11,351,990 B2
(45) Date of Patent: Jun. 7, 2022

(54) SWERVE ASSIST IN A TRANSPORTATION VEHICLE

(71) Applicant: VOLKSWAGEN AKTIENGESELLSCHAFT, Wolfsburg (DE)

(72) Inventor: Maike Wall, Braunschweig (DE)

(73) Assignee: Volkswagen Aktiengesellschaft

( * ) Notice: Subject to any disclaimer, the term of this patent is extended or adjusted under 35 U.S.C. 154(b) by 196 days.

(21) Appl. No.: 16/325,452

(22) PCT Filed: Sep. 4, 2017

(86) PCT No.: PCT/EP2017/072040
§ 371 (c)(1),
(2) Date: Feb. 14, 2019

(87) PCT Pub. No.: WO2018/068945
PCT Pub. Date: Apr. 19, 2018

(65) Prior Publication Data
US 2019/0168749 A1    Jun. 6, 2019

(30) Foreign Application Priority Data
Oct. 11, 2016    (DE) .................. 10 2016 219 757.6

(51) Int. Cl.
*B60W 30/09*    (2012.01)
*B60T 8/24*    (2006.01)
(Continued)

(52) U.S. Cl.
CPC ............ *B60W 30/09* (2013.01); *B60T 8/246* (2013.01); *B60W 10/18* (2013.01);
(Continued)

(58) Field of Classification Search
CPC .... B60W 30/09; B60W 30/095; B60W 30/08; B60W 30/0953; B60W 30/0596;
(Continued)

(56) References Cited

U.S. PATENT DOCUMENTS 3,966,264 A * 6/1976 Mattori ................... B60T 8/172
                                                            303/146
5,596,252 A * 1/1997 Shimizu ............... B62D 5/0463
                                                            318/432
(Continued)

FOREIGN PATENT DOCUMENTS

CN    102815298 A    12/2012
CN    104118431 A    10/2014
(Continued)

OTHER PUBLICATIONS

Office Action for Indian Patent Application No. 201947018013; dated Aug. 28, 2020.
(Continued)

*Primary Examiner* — Russell Frejd
*Assistant Examiner* — Sara J Lewandroski
(74) *Attorney, Agent, or Firm* — Barnes & Thornburg, LLP

(57) ABSTRACT

A swerve assist to assist the driver of a transportation vehicle during an avoidance maneuver so that a collision with an obstacle is avoided. An additional steering torque for amplifying a current steering torque is applied when an avoidance maneuver of the transportation vehicle is detected. A single-wheel braking of the transportation vehicle is actuated to increase a transverse offset of the transportation vehicle.

12 Claims, 3 Drawing Sheets

(51) Int. Cl.
*B62D 15/02* (2006.01)
*B60W 10/20* (2006.01)
*B60W 10/184* (2012.01)
*B60W 30/095* (2012.01)
*B60W 10/18* (2012.01)

(52) U.S. Cl.
CPC .......... *B60W 10/184* (2013.01); *B60W 10/20* (2013.01); *B60W 30/095* (2013.01); *B60W 30/0956* (2013.01); *B62D 15/0265* (2013.01); *B60T 2210/32* (2013.01); *B60W 2510/18* (2013.01); *B60W 2510/20* (2013.01); *B60W 2510/202* (2013.01); *B60W 2520/10* (2013.01); *B60W 2540/12* (2013.01); *B60W 2540/18* (2013.01); *B60W 2554/00* (2020.02); *B60W 2710/18* (2013.01); *B60W 2710/202* (2013.01)

(58) Field of Classification Search
CPC .......... B60T 2201/02; B60T 2201/022; B60T 2201/024; B60T 8/17558
See application file for complete search history.

(56) References Cited

U.S. PATENT DOCUMENTS

| | | | | |
|---|---|---|---|---|
| 6,017,101 A * | 1/2000 | Matsuda | ................. | B60T 8/246 701/72 |
| 9,174,641 B2 * | 11/2015 | Fritz | ..................... | B60W 10/18 |
| 9,340,187 B2 * | 5/2016 | Hecker | ................. | B60T 8/1764 |
| 9,545,911 B2 | 1/2017 | Kim | | |
| 10,427,674 B2 | 10/2019 | Flehmig et al. | | |
| 10,875,525 B2 * | 12/2020 | Lord | ...................... | B60W 30/09 |
| 2005/0043867 A1 * | 2/2005 | Kudo | .................... | B62D 1/286 701/25 |
| 2005/0203705 A1 * | 9/2005 | Izumi | ..................... | B62D 5/008 340/436 |
| 2005/0267683 A1 * | 12/2005 | Fujiwara | ............... | G01S 13/931 340/903 |
| 2007/0288133 A1 * | 12/2007 | Nishira | ................ | G05D 1/0214 701/23 |
| 2007/0294019 A1 * | 12/2007 | Nishira | .................... | B60T 7/22 701/70 |
| 2008/0040002 A1 * | 2/2008 | Galkoswki | ........... | B62D 15/025 701/43 |
| 2009/0326820 A1 * | 12/2009 | Shimizu | ................... | B60T 7/22 701/301 |
| 2011/0196579 A1 | 8/2011 | Tokimasa et al. | | |
| 2014/0142839 A1 * | 5/2014 | Kaminade | .............. | G08G 1/163 701/301 |
| 2014/0288785 A1 * | 9/2014 | Bretzigheimer | .... | B60T 8/17558 701/48 |
| 2014/0379244 A1 * | 12/2014 | Haeussler | ............. | B60W 30/09 701/117 |
| 2015/0232090 A1 * | 8/2015 | Jeon | ...................... | B60W 50/14 701/1 |
| 2015/0336579 A1 * | 11/2015 | Yoshizawa | ........ | B60W 30/0953 701/70 |
| 2016/0272171 A1 * | 9/2016 | Bunk | .................. | B60W 10/184 |
| 2016/0297478 A1 * | 10/2016 | Inoue | ...................... | B60T 8/246 |
| 2017/0008518 A1 * | 1/2017 | Arndt | ..................... | G08G 1/166 |
| 2017/0057498 A1 * | 3/2017 | Katoh | ................. | B60W 40/105 |
| 2017/0294119 A1 * | 10/2017 | Tamura | ................ | G08G 1/0133 |
| 2018/0043886 A1 * | 2/2018 | Keller | .................... | B60W 40/04 |
| 2018/0319380 A1 * | 11/2018 | Laine | ........................ | B60T 7/22 |
| 2020/0324748 A1 * | 10/2020 | Hiraga | ................. | B60T 8/3205 |
| 2021/0197806 A1 * | 7/2021 | Newman | ............... | G08G 1/166 |

FOREIGN PATENT DOCUMENTS

| | | |
|---|---|---|
| CN | 104973125 A | 10/2015 |
| CN | 105555645 A | 5/2016 |
| DE | 102004059002 A1 | 6/2006 |
| DE | 102004062496 A1 | 7/2006 |
| DE | 102005003274 A1 | 7/2006 |
| DE | 102008005999 A1 | 7/2009 |
| DE | 102008040077 A1 | 1/2010 |
| DE | 102009014824 A1 | 10/2010 |
| DE | 102010002105 A1 | 8/2011 |
| DE | 102011106082 A1 | 1/2013 |
| DE | 102012112043 A1 | 6/2014 |
| DE | 102013208727 A1 | 11/2014 |
| DE | 102014005924 A1 | 11/2014 |
| DE | 102013211643 A1 | 12/2014 |
| DE | 102014206343 A1 | 10/2015 |
| DE | 102014016567 A1 | 5/2016 |
| JP | 2015209128 A | 11/2015 |
| KR | 20120137025 A * | 12/2012 |

OTHER PUBLICATIONS

Search Report for German Patent Application No. 10 2016 219 757.6; dated Jun. 19, 2017.
Search Report for International Patent Application No. PCT/EP2017/072040; dated Dec. 5, 2017.

* cited by examiner

SWERVE ASSIST IN A TRANSPORTATION VEHICLE

PRIORITY CLAIM

This patent application is a U.S. National Phase of International Patent Application No. PCT/EP2017/072040, filed 4 Sep. 2017, which claims priority to German Patent Application No. 10 2016 219 757.6, filed 11 Oct. 2016, the disclosures of which are incorporated herein by reference in their entireties.

SUMMARY

Illustrative embodiments relate to a swerve assist for a transportation vehicle, with which a driver of the transportation vehicle is assisted when avoiding an obstacle.

BRIEF DESCRIPTION OF THE DRAWINGS

The disclosed embodiments are described in detail with reference to the figures, in which.

DETAILED DESCRIPTION

Figure 1:
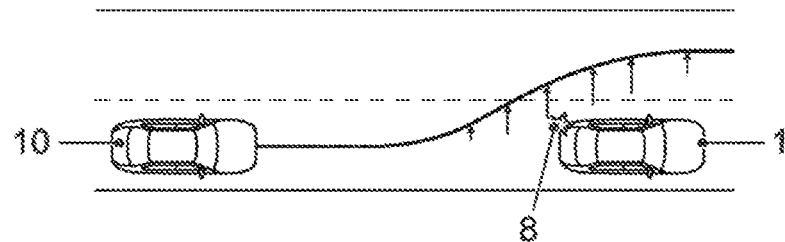
FIG. 1 shows a situation in which the transportation vehicle is driving toward an obstacle during an evasive maneuver.

DE 10 2008 005 999 A1 describes the assistance to the driver of a transportation vehicle when keeping to a lane bounded by lane markings. In this case, a yaw moment that counteracts the tendency to leave the lane can also be produced with selective single wheel braking. Whereas DE 10 2008 005 999 A1 describes a lane holding assistance function (i.e., a convenience function), with which the transportation vehicle is held within lane markings, the disclosed swerve assist is a safety function that assists the driver when controlling the transportation vehicle in a critical situation and as a rule ignores existing road markings during an evasive maneuver.

DE 10 2005 003 274 A1 discloses the avoidance or reduction of the consequences of collisions when avoiding obstacles. In this case, the driver is assisted by decelerating the transportation vehicle and by a suitable change of the steering demand by the driver.

DE 10 2004 062 496 A1 describes collision avoidance or collision consequence reduction for a transportation vehicle that is achieved by autonomous partial braking in combination with an autonomous steering intervention.

According to the prior art, a swerve assist (i.e., a safety function) and a lane holding assistance function (i.e., a convenience function) are different. Whereas the driving situation in the case of swerve assist is critical (i.e., a collision with an obstacle is immediately impending), the lane holding assistance function is independent of an obstacle and on the criticality of the driving situation. Whereas the swerve assist only intervenes if the driver is active, the lane holding assistance function can also engage in the event of inactivity of the driver or in the event of low activity of the driver. Whereas the swerve assist is mainly based on a calculated trajectory, this is not the case with a lane holding assistance function as a rule. In summary, there is a considerable difference between a swerve assist and a lane holding assistance function.

Starting from the prior art outlined above, the disclosed embodiments assist the driver of a transportation vehicle during an evasive maneuver without a collision occurring.

Disclosed is a method for swerve assist for a transportation vehicle and a device.

In the context of the disclosure, a method for swerve assist for a transportation vehicle is provided, which comprises:

Detecting an avoidance maneuver of the transportation vehicle. The avoidance maneuver is especially detected using an activity (for example, actuation of a brake of the transportation vehicle or the steering of the transportation vehicle) of the driver of the transportation vehicle, which for its part is detected with suitable sensors of the transportation vehicle.

If an avoidance maneuver was detected in the previous operation, an additional steering torque is applied (for example, to the steering wheel) to boost an already existing steering torque. Owing to the additional steering torque, a lateral displacement of the transportation vehicle that was initiated by the existing or present steering torque is (further) increased. This means that a desired lateral displacement of the transportation vehicle is achieved faster owing to the additional steering torque. Owing to the additional steering torque, in particular, the tendency to leave the current lane is therefore increased to avoid an obstacle disposed in the lane, for example.

Operating or activating a single wheel braking of the transportation vehicle to further increase the lateral displacement or the yaw movement of the transportation vehicle, which was produced by the (present) steering torque and the additional steering torque. By using a single wheel braking, one or more (but generally speaking not all) wheels of the transportation vehicle is/are braked to increase the lateral displacement or the yaw movement of the transportation vehicle.

By the combination of steering torque and single wheel braking, the driver can be assisted in his avoidance maneuver such that no collision occurs.

The avoidance maneuver is especially detected using a steering movement by the driver. In this case, the steering movement causes the (present) steering torque, which is boosted by the additionally applied steering torque.

In other words, according to the disclosed embodiment, using the steering movement by the driver (i.e., the driver suitably turns the steering wheel of the transportation vehicle) it is detected that the driver is starting the avoidance maneuver and, for example, wishes to avoid an obstacle. The additional steering torque is then applied in the avoidance direction (i.e., in the same direction as the present steering torque), so that effectively an additional force is acting on the steering wheel in the turning direction selected by the driver. It is thereby achieved that the driver achieves his desired steering wheel angle faster. The great benefit of the additional steering torque is to accelerate the initial steering movement (initiated by the driver) to thereby achieve a faster (and as a result also greater) lateral displacement.

Advantageously, the single wheel braking is operated after the application of the additional steering torque.

The best effect on the lateral displacement of the transportation vehicle is achieved with single wheel braking if the transportation vehicle is already in a turning movement or a yaw movement. Said yaw movement is produced by the steering torque (including the additional steering torque). In this case, gilt that the lateral displacement is increased more by the single wheel braking, the greater is the yaw movement of the transportation vehicle when the single wheel braking is used.

Detecting the avoidance maneuver also includes detecting an obstacle and determining a measure of a probability that the transportation vehicle will collide with the obstacle. In this case, there is only an avoidance maneuver (i.e., an avoidance maneuver is only detected), if the previously determined measure lies above a predetermined threshold value. In other words, there is an avoidance maneuver if on the one hand a desire to avoid is detected using the steering movement by the driver and if on the other hand the criticality of the current driving situation of the transportation vehicle allows the presence of an avoidance maneuver to be concluded (i.e., the measure of probability of a collision exceeds the threshold value). In this case, a time span to an expected collision with the obstacle ("time to collision") can also be incorporated in the determination of the measure. As a rule, the measure is greater, the shorter is the time span.

As the avoidance maneuver is determined not only using an activity (for example, a steering movement) of the driver, but also using the criticality, the probability of an incorrectly initiated swerve assist can be drastically reduced.

According to a disclosed embodiment, a trajectory is determined depending on the steering movement and a position of the obstacle. In this case, the trajectory is so determined that it differs in the direction of the steering movement from the current direction of travel of the transportation vehicle and extends such that the transportation vehicle does not collide with the obstacle when travelling along the trajectory. The additional steering torque is applied, and the single wheel braking is operated so that the transportation vehicle drives along the trajectory determined in this way.

By determining and following the trajectory, the lateral displacement of the transportation vehicle at the start of the avoidance maneuver is beneficially produced such that the transportation vehicle not only avoids a collision with the obstacle, but also passes the obstacle in a state in which it is always steerable. Using the trajectory, in particular, a setpoint value is determined and compared with an actual value corresponding to the movement of the transportation vehicle. The system interventions (additional steering torque and single wheel braking) are adjusted so that the transportation vehicle moves along the trajectory as much as possible.

Advantageously, the strength of the single wheel braking is a function of a current speed of the transportation vehicle. In this case, the strength of the single wheel braking or the intervention into the single wheel braking is weaker, the lower the current speed of the transportation vehicle. This means that the single wheel braking is operated correspondingly more strongly with increasing speed of the transportation vehicle.

The disclosed embodiment comprises the benefit that at low speeds a stronger intervention into the single wheel braking is avoided, which would be unpleasant for the driver and would reduce speed unnecessarily.

It would, however, also be possible if the single wheel braking were configured in the same way over the entire speed range, i.e., regardless of the current speed of the transportation vehicle.

According to a further disclosed embodiment, the additional steering torque is withdrawn while the single wheel braking is being operated.

As already mentioned, the benefit of the additional steering torque is that the driver achieves the desired steering wheel angle faster, whereby the lateral displacement is also increased. If the steering wheel angle desired by the driver has once been reached, it can, for example, continuously be fully withdrawn, because the further lateral displacement is now better achieved by the actuation of the single wheel braking.

The disclosed swerve assist is carried out in the context of controllability limits both for the additional steering torque and for the single wheel braking. In this case, the controllability limits are defined such that the driver, despite the interventions carried out (in respect of the additional steering torque and/or the single wheel braking), is always in a position to overrule the corresponding intervention without great effort. In the case of a combination of two interventions (additional steering torque and single wheel braking) therefore the combination of the two interventions can also be controllable by the driver. For this purpose, a strength of intervention function can be defined, which determines the strength of the intervention depending on the additional steering torque and the strength of the single wheel braking. Said strength of the intervention must also always lie below the controllability limit(s) in the case of a combination of additional steering torque and single wheel braking.

The additional steering torque and the strength of the single wheel braking are therefore beneficially selected so that on the one hand a very good effect (for example, very rapid achievement of the desired lateral displacement) is achieved and that on the other hand the controllability limit is not exceeded is (i.e., the strength of the intervention determined from the strength of intervention function is below the controllability limit). Therefore, for example, at first the additional steering torque is applied at a level such that the strength of the intervention determined from the strength of intervention function approximately corresponds to the controllability limit. Because no single wheel braking would be able to be activated in the situation (because otherwise the controllability limit for the combination of the additional steering torque and the single wheel braking would be exceeded), the additional steering torque is withdrawn if or while the single wheel braking is activated. As a result, it is provided for this that the strength of the intervention determined from the strength of intervention function always lies below the controllability limits even for the combination of the additional steering torque and the single wheel braking.

According to a further disclosed embodiment, for example, it is detected using the determined trajectory that the transportation vehicle steering should be returned during the avoidance maneuver. In this case, returning the steering is carried out in a direction that is opposite to the steering movement with which the avoidance maneuver was initiated. In the same way as at the start of the avoidance maneuver, now a further additional steering torque is applied to initiate and/or to assist returning the steering. Finally, a further single wheel braking of the transportation vehicle is carried out (especially while the further additional steering torque is withdrawn) to increase the lateral displacement of the transportation vehicle.

Whereas the start of the avoidance maneuver is initiated by the driver, the initiation of returning the steering is mainly carried out based on the planned trajectory. It is however also possible that the driver initiates returning the steering. This means that, in the first case (initiation by a system or a disclosed device) the driver can effectively be given an impetus for reverse steering or returning the steering with the additional steering torque if the driver has not yet actively returned the steering. Regardless of whether returning the steering is or is not initiated by the driver himself, the procedure when returning the steering is equivalent to directing (i.e., at the start of the avoidance maneuver). The driver is assisted by the further additional steering torque at first and then by a yaw torque, which is produced by the further single wheel braking. Thus, the driver is assisted on the one hand to avoid the obstacle the in a critical situation. On the other hand, with the disclosed embodiment the driver is assisted in the context of the scope of orienting the transportation vehicle straight ahead again at the end of the avoidance maneuver.

As a rule, during an evasive maneuver a so-called s-shaped path is driven. I.e. the driver first steers to the right (left) and then to the left (right). Therefore, it is beneficial if the procedure is similar when returning the steering (only in the opposite direction) to when steering (i.e., at the start of the avoidance maneuver). Owing to assistance by a boost to the steering movement, both the initial change of direction and returning the steering by the driver are significantly boosted during an evasive maneuver.

A swerve assist device for a transportation vehicle is also provided. In this case, the device comprises a control method or mechanism, transportation vehicle steering and at least two individual wheel brakes of the transportation vehicle. The device is designed to detect an avoidance maneuver of the transportation vehicle by the control method or mechanism and to apply an additional steering torque to the steering by the control method or mechanism to boost an existing steering torque. In addition, the device is designed to operate at least one of the individual wheel brakes by the control method or mechanism to increase a lateral displacement of the transportation vehicle.

The disclosed device comprises the same benefits as the disclosed method, which are mentioned in detail above, so that a repetition is omitted here.

Finally, within the scope of the disclosure, a transportation vehicle is provided that comprises the disclosed device.

The disclosed embodiments utilize the specific potential of each of the respective interventions by the combination of the additional steering torque and the single wheel braking. At the start of the avoidance maneuver, there is great potential in an additional steering torque for accelerating the steering movement. As a result, the transportation vehicle enters a yaw motion that is then boosted by the single wheel braking.

In FIG. 1, a disclosed transportation vehicle 10 is represented during an evasive maneuver. Because the driver of the transportation vehicle 10 is steering too little, the transportation vehicle 10 collides with an obstacle 1 (another transportation vehicle disposed ahead of the transportation vehicle 10). In this case, the point of impact 8 of the collision is on the rear at the left on the obstacle 1 or the other transportation vehicle.

Figure 2:
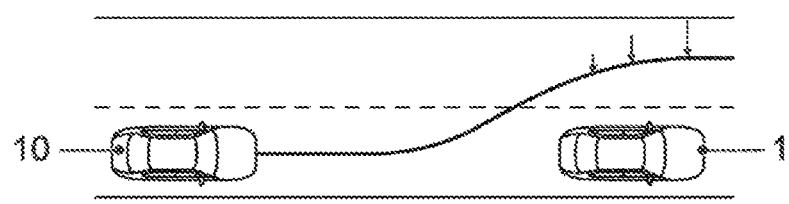
FIG. 2 shows a situation in which the transportation vehicle exits the lane during an evasive maneuver.

In FIG. 2, in a similar manner to FIG. 1 a disclosed transportation vehicle 10 is represented during an evasive maneuver. In this case, the driver of the transportation vehicle 10 persists too long when steering out, so that the transportation vehicle 10 departs from the lane.

Figure 3:
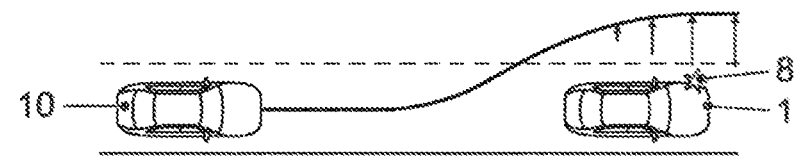
FIG. 3 shows a situation in which the transportation vehicle collides with an obstacle laterally during an evasive maneuver.

In FIG. 3, in a similar manner to FIG. 1 and FIG. 2, a disclosed transportation vehicle 10 is represented during an evasive maneuver. In this case, the driver of the transportation vehicle 10 steers too much, so that an overshoot occurs and thus a lateral collision with the obstacle 1 occurs. In this case, the point of impact 8 during the collision lies at the front on the left of the obstacle 1 or the other transportation vehicle.

Figure 4:
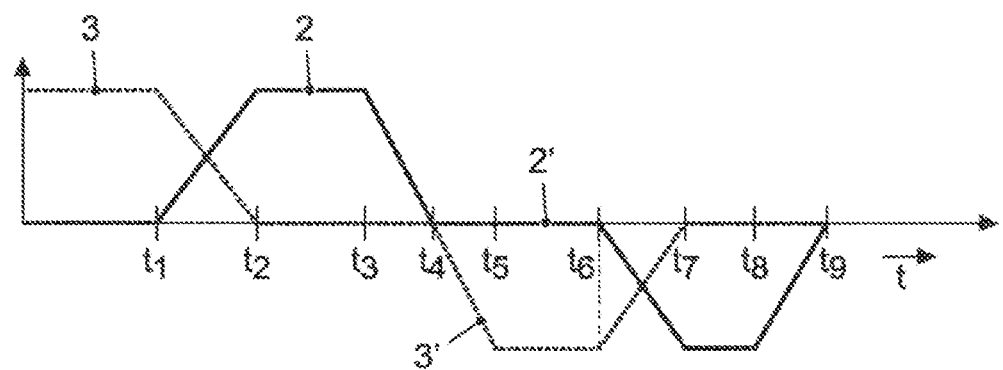
FIG. 4 shows the time profiles of an additional steering torque and a strength of a braking effect of single-wheel braking for a disclosed embodiment.

In FIG. 4, the profile of the strength 2, 2' of a braking effect of a single wheel braking and the profile of an additional steering torque 3, 3' are represented against time during an evasive maneuver for a disclosed embodiment.

Once a desire to avoid on the part of the driver or the start of an avoidance maneuver is detected using a steering movement by the driver and using the criticality of the driving situation (probability of a collision with an obstacle), the additional steering torque jumps to a value to boost the steering torque caused by the steering movement. The additional steering torque is held constant until a point in time t1. From the point in time t1, on the one hand the additional steering torque 3 is withdrawn and for another thing single wheel braking of the transportation vehicle 10 is activated, wherein the braking effect 2 is continuously increased. By the actuation of the single wheel braking, the lateral displacement produced by the (existing) steering torque and the additional steering torque, which add together, is increased further.

From a point in time t2, the strength 2 of the braking effect of the single wheel braking persists at a high level until a point in time t3 while the additional steering torque 3 is completely reduced. From the point in time t3, the braking effect of the single wheel braking is completely withdrawn until a point in time t4, wherein from the point in time t4 the additional steering torque 3' is continuously increased until a point in time t5 in a direction opposite to the additional steering torque 3. The point in time t4 thus marks a driver of the transportation vehicle 10 returning the steering. From a point in time t6, on the one hand the additional steering torque 3' is withdrawn and on the other hand the braking effect 2' of a (usually different) single wheel braking of the transportation vehicle 10 is continuously increased. At the point in time t7, the additional steering torque 3' is completely reduced, whereas the strength of the braking effect remains constant until the point in time t8. From the point in time t8, the strength 2' of the braking effect is continuously and completely reduced until a point in time t9.

Figure 5:
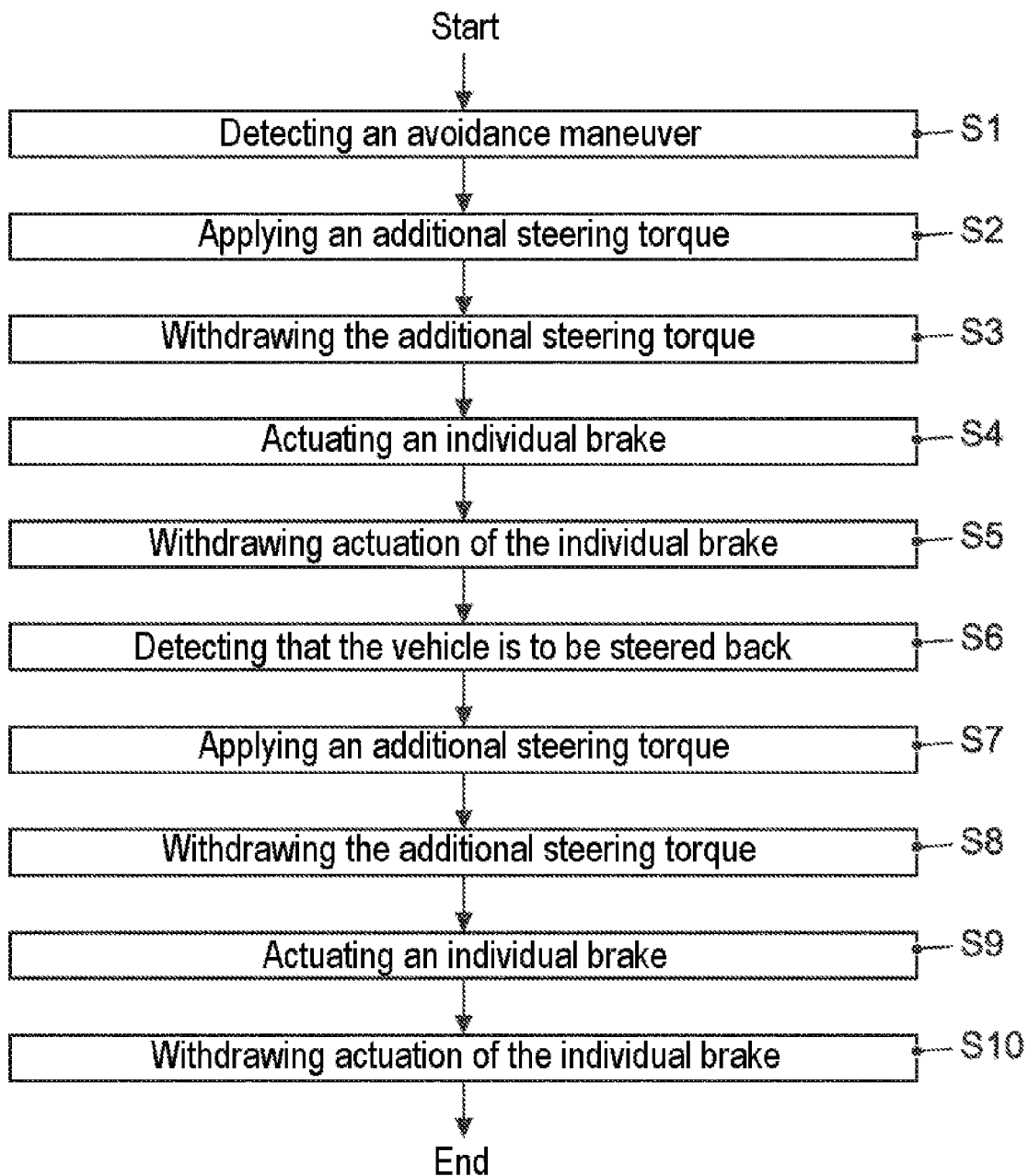
FIG. 5 shows the flow chart of a method for swerve assist in accordance with a disclosed embodiment.

In FIG. 5, the flow chart of a method of swerve assist is represented in accordance with a disclosed embodiment.

In the first operation at S1, the start of an avoidance maneuver is detected using a steering movement by the driver together with a criticality of the driving situation (i.e., the probability of colliding with an obstacle exceeds a threshold value). Therefore, in an operation at S2 an additional steering torque is applied to boost the steering torque caused by the steering movement by the driver. In operation at S3, the additional steering torque is withdrawn again, whereas in operation at S4 single wheel braking of the transportation vehicle is actuated. Steps S3 and S4 can also be carried out simultaneously. The lateral displacement of the transportation vehicle caused by the (existing) steering torque and the additional steering torque is beneficially further boosted by actuation of the single wheel braking in operation at S4. In operation at S5, the actuation of the single wheel braking is withdrawn.

In operation at S6, it is detected that the transportation vehicle steering is to be returned, for example, using a planned trajectory. Therefore, in operation at S7 an additional steering torque is applied, which is opposed to the additional steering torque from operation at S2. Similarly to at the start of the avoidance maneuver (operations at S1 through S5), a desired lateral displacement of the transportation vehicle is achieved faster by the application of the additional steering torque in operation at S7. In operation at S8, the additional steering torque is withdrawn, whereas in operation at S9 a (different) single wheel braking of the transportation vehicle is actuated (i.e., the wheels are braked differently than in operation at S4). Similarly to in operations at S2 and S3, operations at S8 and S9 can also be carried out simultaneously. Finally, in operation at S10 the actuation of the single wheel braking is also withdrawn, so that after operation at S10 neither an additional steering torque nor actuation of an individual wheel brake is acting on the transportation vehicle 10.

Figure 6:
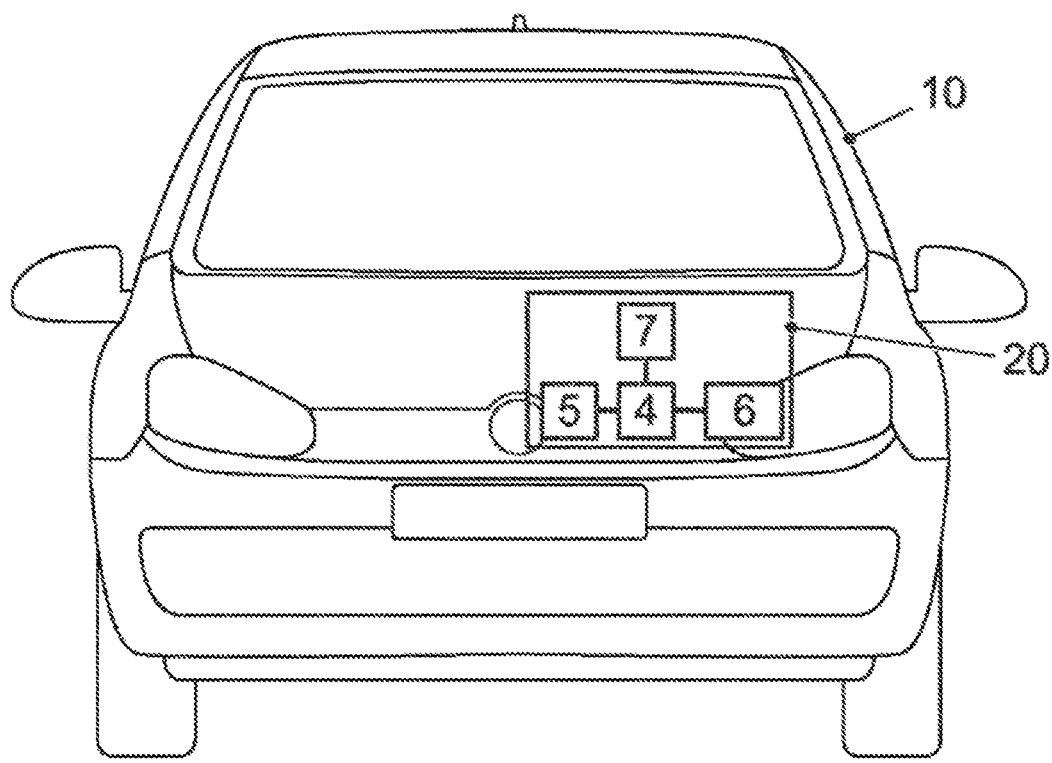
FIG. 6 schematically shows a disclosed transportation vehicle.

In FIG. 6, a disclosed transportation vehicle 10 with a disclosed device 20 is represented schematically. In this case, the disclosed device 20 comprises a control method or mechanism 4, at least two individual wheel brakes 5, 6 (as a rule all wheels of the transportation vehicle 10 can be braked individually) and steering 7. The device 20 is designed to detect an avoidance maneuver of the transportation vehicle, for example, from a steering movement by the driver, by the control method or mechanism 4 and to apply an additional steering torque to the steering 7 by the control method or mechanism 4 to boost the steering torque caused by the steering movement as a result. As the device 20 operates at least one of the individual wheel brakes 5, 6 by the control method or mechanism 4 thereof, a lateral displacement of the transportation vehicle 10 produced by the (existing) steering torque and the additional steering torque is increased further.

REFERENCE CHARACTER LIST 1 obstacle
2,2' strength of a braking effect of single wheel braking
3,3' additional steering torque
4 control method or mechanism
5,6 individual wheel brake
7 steering
8 point of impact in a collision
10 transportation vehicle
20 device
S1-S10 operations of the method
t time
$t_x$ point in time

The invention claimed is:

1. A method for providing swerve assist for a transportation vehicle, the method comprising:
   detecting an avoidance maneuver of the transportation vehicle;
   applying an additional steering torque to boost an existing steering torque in response to the avoidance maneuver being detected, wherein the additional steering torque is kept constant up to a point in time, and at that point in time;
   withdrawing the additional steering torque and simultaneously commencing actuating single wheel braking of the transportation vehicle to increase a lateral displacement of the transportation vehicle.

2. The method of claim 1, wherein:
   the avoidance maneuver is detected by detecting a steering movement by a driver of the transportation vehicle; and
   the existing steering torque is applied by the steering movement.

3. The method of claim 2, further comprising:
   detecting the avoidance maneuver includes detecting an obstacle;
   determining a measure of a probability that the transportation vehicle collides with the obstacle; and
   detecting the avoidance maneuver only in response to the measure exceeding a predetermined threshold value.

4. The method of claim 3, further comprising:
   determining a trajectory based on the steering movement and a position of the obstacle, so the transportation vehicle does not collide with the obstacle when travelling along the trajectory; and
   applying the additional steering torque and actuating the single wheel braking so the transportation vehicle drives along the trajectory.

5. The method of claim 1, further comprising:
   detecting that the transportation vehicle steering is to be returned;
   applying a further additional steering torque to initiate or to assist returning the steering of the transportation vehicle; and
   actuating the single wheel braking of the transportation vehicle to increase a lateral displacement of the transportation vehicle produced by returning the steering.

6. The method of claim 1, wherein a strength of a braking effect of the single wheel braking is a function of the speed of the transportation vehicle.

7. A device for swerve assist for a transportation vehicle, wherein:
   the device comprises a controller and steering of the transportation vehicle,
   the device detects an avoidance maneuver of the transportation vehicle by the controller and applies an additional steering torque to the steering by the controller to boost an existing steering torque, wherein the additional steering torque is kept constant up to a point in time,
   wherein the device comprises individual wheel brakes of the transportation vehicle, and
   the device actuates at least one of the individual wheel brakes by the controller to increase a lateral displacement of the transportation vehicle,
   wherein the additional torque is withdrawn at the point in time and the device simultaneously commencing actuation of the at least one of the individual wheel brakes at the point in time.

8. The device of claim 7, wherein:
   the avoidance maneuver is detected by detecting a steering movement by a driver of the transportation vehicle; and
   the existing steering torque is applied by the steering movement.

9. The device of claim 8, wherein the method further comprises:
   detecting the avoidance maneuver includes detecting an obstacle;
   determining a measure of a probability that the transportation vehicle collides with the obstacle; and
   detecting the avoidance maneuver only in response to the measure exceeding a predetermined threshold value.

10. The device of claim 9, wherein the method further comprises:
    determining a trajectory based on the steering movement and a position of the obstacle, so the transportation vehicle does not collide with the obstacle when travelling along the trajectory; and applying the additional steering torque and actuating the single wheel braking so the transportation vehicle drives along the trajectory.

11. The device of claim 7, wherein a strength of a braking effect of the single wheel braking is a function of the speed of the transportation vehicle.

12. The device of claim 7, wherein the method further comprises:

detecting that the transportation vehicle steering is to be returned;

applying a further additional steering torque to initiate or to assist returning the steering of the transportation vehicle; and actuating the single wheel braking of the transportation vehicle to increase a lateral displacement of the transportation vehicle produced by returning the steering.

* * * * *